United States Patent Office
Des. 227,722
Patented July 17, 1973
227,722
COMBINED BED AND STORAGE UNIT
Michael A. Mendlin, Springfield, N.J., assignor to Bunk Trunk Distributors, Paramus, N.J.
Filed July 6, 1971, Ser. No. 160,258
Term of patent 14 years
Int. Cl. D6—01
U.S. Cl. D6—80
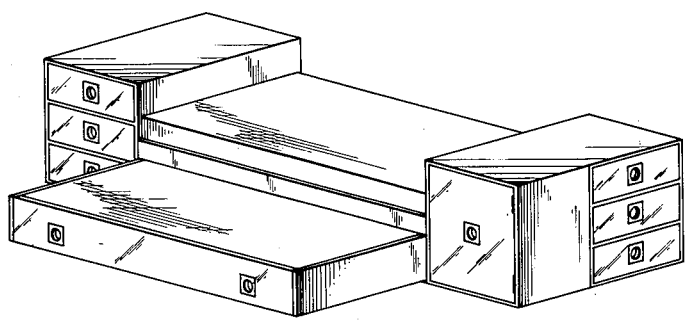
FIG. 1
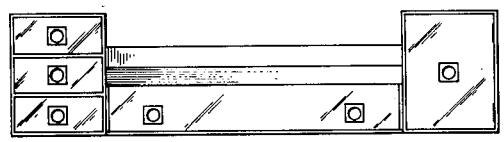 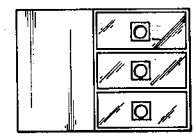
FIG. 2      FIG. 3
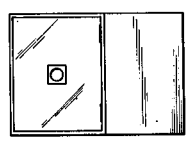 
FIG. 4      FIG. 5

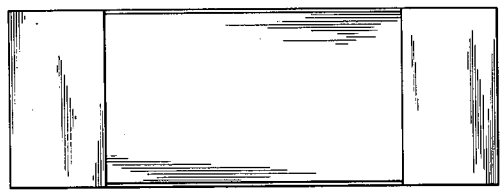

FIG. 6

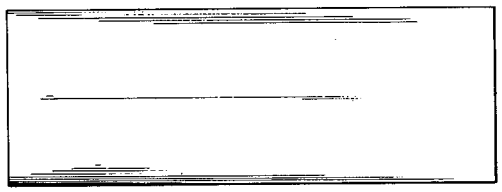

FIG. 7

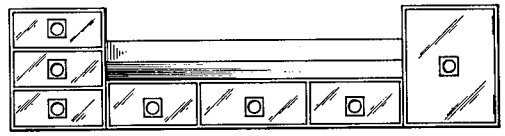

FIG. 8

FIG. 1 is a perspective view of a combined bed and storage unit showing my new design;
FIG. 2 is a front elevational view thereof;
FIG. 3 is a right side elevational view thereof;
FIG. 4 is a left side elevational view thereof;
FIG. 5 is a rear elevational view thereof;
FIG. 6 is a top plan view thereof;
FIG. 7 is a bottom plan view thereof; and
FIG. 8 is a front elevational view of a combined bed and storage unit showing a second embodiment of my new design which differs from the first embodiment in the replacement of the trundle bed by a three-drawer storage unit.

I claim:
The ornamental design for a combined bed and storage unit, substantially as shown and described.

References Cited

UNITED STATES PATENTS

| D. 46,907 | 2/1915 | Knapp | D6—80 |
| D. 187,257 | 2/1960 | Hackett | D6—80 |

FOREIGN PATENTS 660,323  2/1929  France.

OTHER REFERENCES

Furniture Retailer, February 1955, p. 29, bottom left hand corner.

WALLACE R. BURKE, Primary Examiner

J. M. GANDY, Assistant Examiner